July 23, 1963 L. HUNSINGER 3,098,503
MIXING FAUCET
Filed March 15, 1960 3 Sheets-Sheet 1
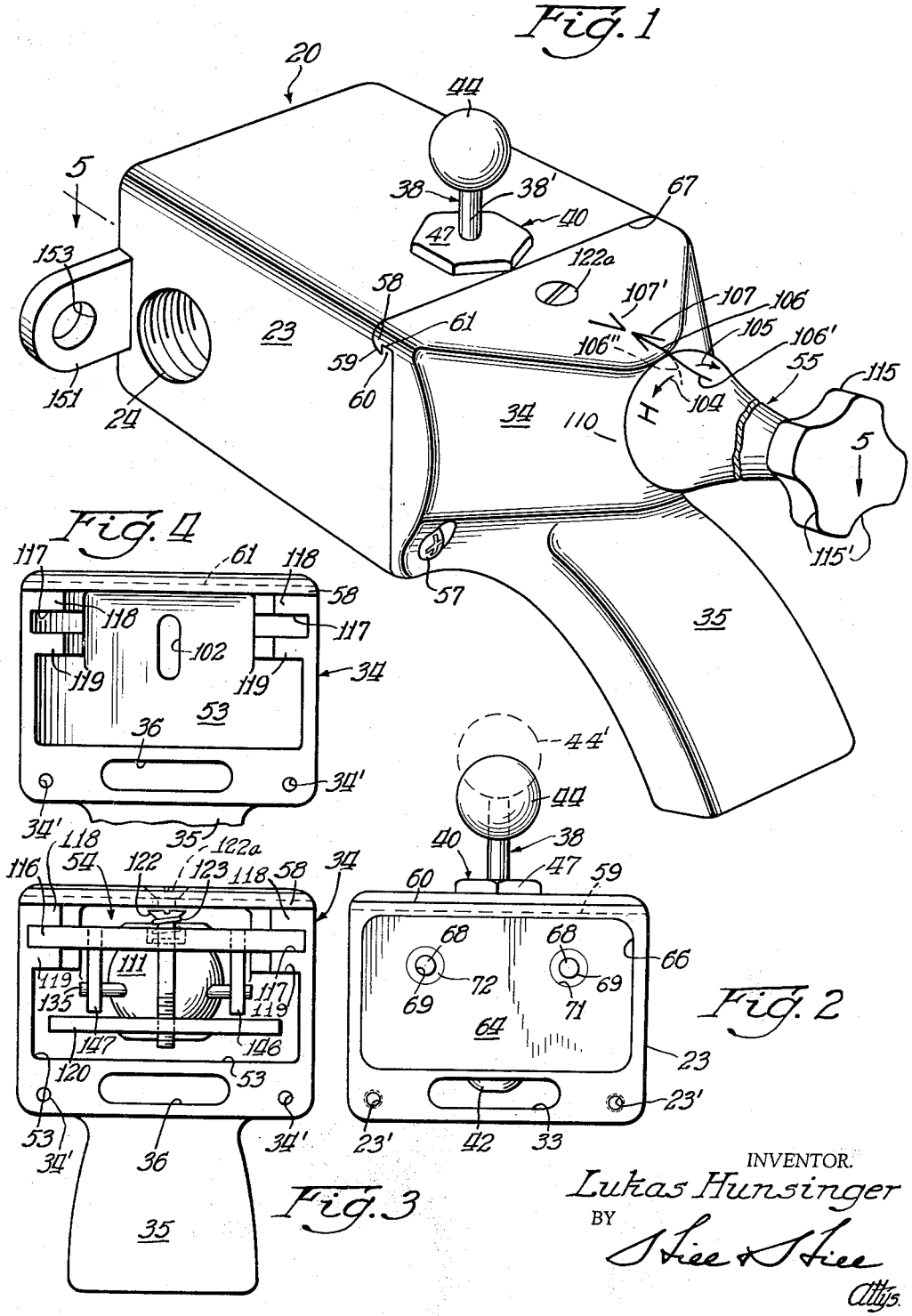
INVENTOR.
Lukas Hunsinger
BY
Stiee & Stiee
Attys.

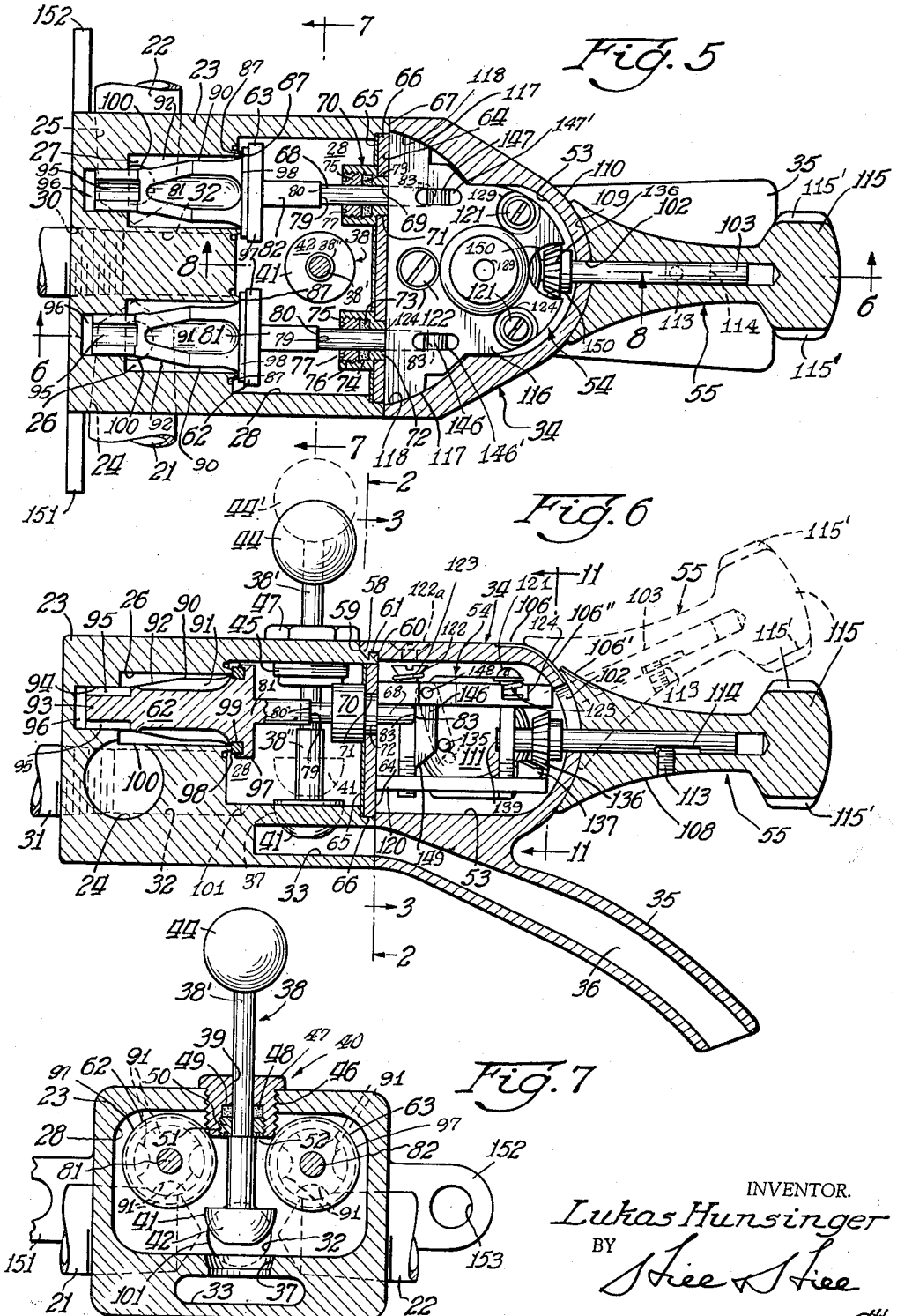

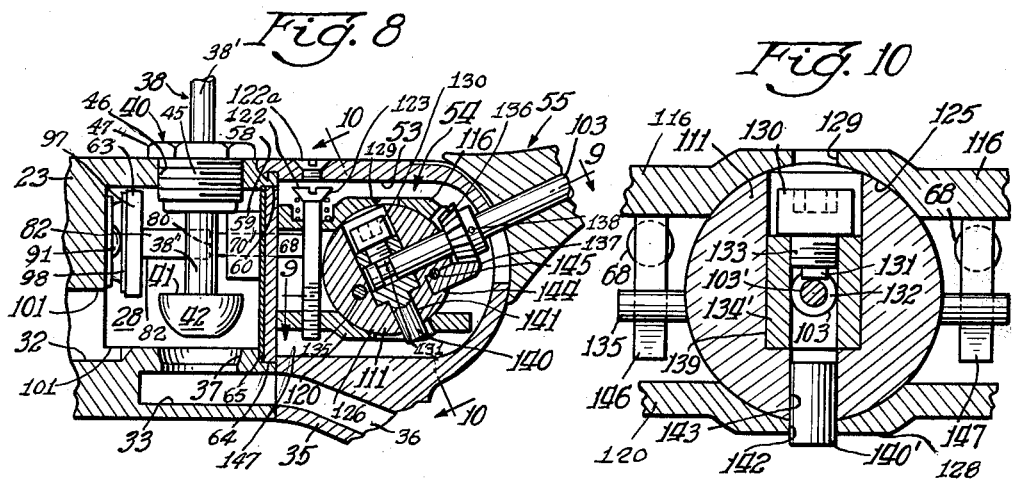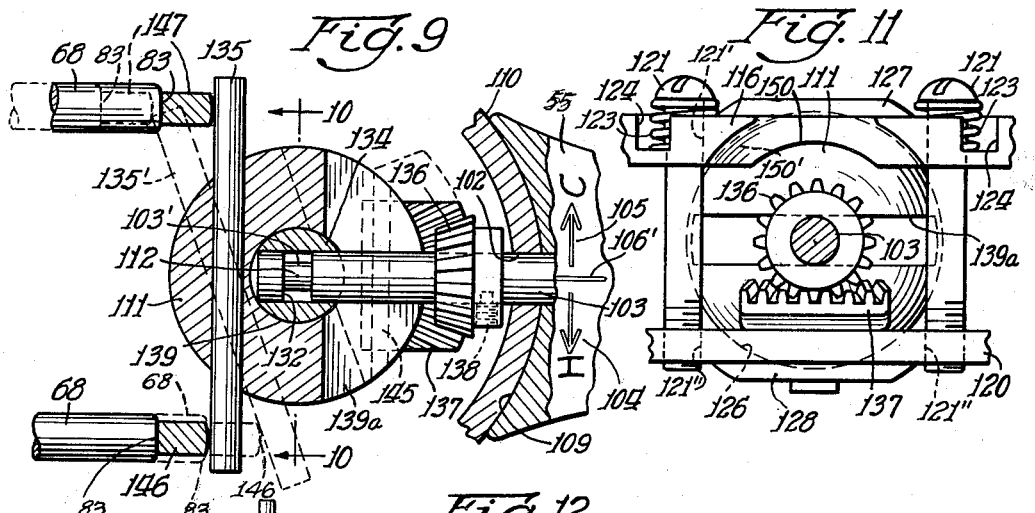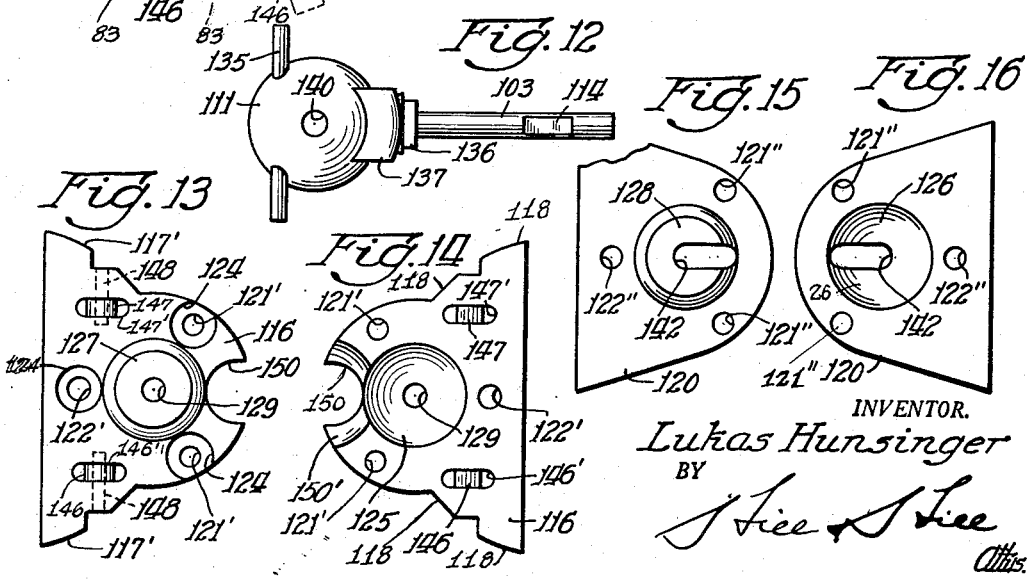

United States Patent Office 3,098,503
Patented July 23, 1963

3,098,503
MIXING FAUCET
Lukas Hunsinger, Chicago, Ill.
Filed Mar. 15, 1960, Ser. No. 15,080
19 Claims. (Cl. 137—597)

This invention relates to mixing faucets and particularly relates to an improved form of mixing valve for use with faucets such as are used with bathtubs, and to which a shower head may be operatively connected, bathroom lavatories, kitchen sink faucets and kitchen sink faucets in combination with a sprayer for spraying dishes. The sprayer is operatively connected to a hose which in turn is operatively connected to the faucet. This invention is an improvement over the structure of my mixing faucet disclosed and claimed in my application, Serial No. 655,-080 filed April 25, 1957 which issued as United States Patent No. 2,928,422 on March 15, 1960.

A principal object of the invention is to provide an improved valve which combines the functions of mixing two separate fluid streams of the cold and hot water supply in blended discharge and controlling the temperature of the discharge from cold through the blended temperature to hot and also controlling the quantity of discharge from a full flow to a completely shut-off condition. The invention is particularly useful in various embodiments of hot and cold water faucets conventionally used in the modern home and supplants the use of separate faucets for controlling the hot and cold water supply.

Another object of the invention is to provide a valve having a single control member having a combined angular movement in a vertical plane within an angular movement from its lowermost position in the "off" position and in its uppermost position in its "on" position, and further adapted in its "on" position with a rotary movement in either direction to control the blending of the fluids, and when moved between the angular positions from full "off" to full "on" to control the quantity of flow and upon rotation of the valve to control the blending of the fluids.

Still another object of the invention is to provide a valve construction for faucets of the type as used in the modern home in which the control member may assume any one of an infinite number of positions which may lie either in or intermediate the aforesaid positions from full "off" to full "on" so that any desired combinations of blending and volume of flow may be obtained.

A further object of the invention is to provide a valve mechanism which may discharge cold water from its closed position to its full maximum open position and with intermediate quantities therebetween, and similarly discharge only hot water from its full open position to its full closed position and intermediate positions therebetween, and also to blend the fluids, for example, from hot to cold and intermediate thereof from the maximum discharge to a shut-off position and intermediate positions thereof.

Still another object of the invention is to provide a mixing faucet having a single control member and mixing valve mechanism wherein the single control member formed as a handle operatively connected to the mixing valve mechanism provides the following features of valve operation with the handle in its lowermost "off" position, neither hot nor cold water is discharged but as the handle is raised angularly between its full "off" position to its full "on" position a blended mixture of hot and cold water is discharged with intermediate quantities, and with the handle in its full "on" position, upon rotation to the right will discharge the maximum quantity of blended fluid to the maximum quantity of cold water, and upon rotation of the handle to the left in its full "on" position will discharge a maximum quantity of blended water to the maximum temperature of the hot water discharged. Likewise in intermediate position, intermediate quantities of blended water will be discharged and upon rotation to the right or to the left, the intermediate quantity of the blended water will change from its blended temperature to the temperature of the cold water supplied and upon rotation to the left will change from its intermediate temperature to the temperature of the hot water supply.

Another object of the invention is to provide a combined mixing valve and volume control valve for mixing faucets wherein complicated valve-operating mechanism and valve constructions for each of the fluids are reduced. A particularly typical problem in such a development has been the problem of sealing the angularly movable and rotatable valve control mechanism with respect to the several flow control valves with which it must function. Therefore, another object of my invention is to provide a combined volume and blending control valve which is provided with relatively simple and efficient means for sealing the valve elements with respect to the passages for the flow of both fluids.

A still further object of the invention is to provide a valve control for mixing faucets which permits ready replacement of the valve and sealing means for the respective fluid passages with a minimum of difficulty so that the ordinary home owner may repair the mixing valve of this construction without recourse to hiring a plumber. With this improved mixing faucet construction, it is possible to replace worn sealing gaskets as simply as in a conventional single-flow faucet.

A still further object of the invention is to provide a valve construction provided with sealing means which will not leak.

Another object of the invention is to provide a valve construction which in addition to the above features, is simple, easily constructed, readily taken apart for repair or replacement of parts and is extremely sturdy and durable.

Still another object of the invention is to provide a mixing valve of this character having an improved mixing valve in combination with sprayer means such as disclosed in the above-identified application for spraying hot or cold water or blended between the maximum temperatures and in which a simple valve means is provided in combination with a mixing valve for controlling the discharge either to the discharge spout of the faucet or to the spraying means.

In order to accomplish the various objects of the invention, I have provided an improved mixing faucet and mixing valve therefor, wherein the mixing valve may be universally operated by a vertical angular movement from its lowermost "off" position to its uppermost "on" position, and for rotary movement within a predetermined range of angularity in its full "on" position and intermediate position for controlling the temperature of fluids from two sources of fluid—preferably hot and cold water as used in the home, and for controlling the quantity discharged therefrom, and in which there is provided a spring-biased spherical control means operatively connected to lost-motion connections which in turn are operatively connected to sliding pins which in turn are operatively connected to a valve for each of the fluid passages so that not only the quantity of fluid may be controlled but also a mixture of the two fluids intermediate the temperature range of the cold and hot fluids. In one embodiment of my invention, I have disclosed this improved form of mixing valve with a faucet as used with a bathtub and wherein there is an auxiliary valve for control of the fluid to a shower head, and either hot, cold or blended fluids may be discharged from the shower head.

In another embodiment of my invention, the improved mixing faucet and mixing valve may be used for mixing and blending hot or cold fluids or discharge of either, and regulating the flow thereof with a swivel connection of the type disclosed in FIGS. 6, 7 and 8 of my United States Patent No. 2,928,422 granted March 15, 1960.

In another embodiment of my invention, the improved mixing faucet and mixing valve thereof, is adapted for use with a discharge spout of the type as disclosed in the aforementioned United States patent for use with a bathroom lavatory of conventional construction.

In still another embodiment, the improved mixing faucet and mixing valve therefor is used with a conventional form of sprayer so that hot, cold or a blended mixture of fluid may be either discharged directly to the sink, or by manipulating an auxiliary valve such as disclosed in FIGS. 11 through 15 of my United States Patent 2,928,422, the fluid in its blended or hot or cold condition, is discharged to the spray head in regulated amounts.

Many other objects and advantages of the construction herein shown and described will be obvious to those skilled in the art from the disclosure herein given.

To this end, my invention consists in the novel construction, arrangement and combination of parts herein shown and described and more particularly pointed out in the appended claims.

Referring now to the accompanying drawings forming part of the specification:

FIG. 1 is a perspective view in elevation, with the valve control handle partly broken away, and with the handle in a full "on" position, illustrating one embodiment of my invention for an improved mixing faucet comprising an improved valve construction for mixing two separate streams, and particularly adapted as a bathtub faucet and incorporating valve mechanism for controlling the fluids to a shower installation;

FIG. 2 is an end elevation of the main body of the mixing faucet, with the spout housing and valve control means detached, taken along line 2—2 of FIG. 6, looking in the direction of the arrows and illustrating the cover plate for the mixing chamber of the embodiment of FIG. 1;

FIG. 3 is an end view in elevation of the valve housing and valve control means detached from the main body portion and taken along line 3—3 of FIG. 6 looking in the direction of the arrow;

FIG. 4 is a partial view in end elevation similar to FIG. 3 but with the valve actuating means removed illustrating the means for mounting thereof of the mixing faucet of FIG. 1;

FIG. 5 is a plan view partly in section illustrating the valve means for the control of the fluid passages and the spring-biased spherical control means of the mixing valve of FIG. 1, taken along a plane passed through line 5—5 of FIG. 1, and looking in the direction of the arrows;

FIG. 6 is a vertical view in section, taken along line 6—6 of FIG. 5, looking in the direction of the arrows;

FIG. 7 is a vertical cross-sectional view taken along line 7—7 of FIG. 5 looking in the direction of the arrows, illustrating the position of the valve means for the fluid passages and the valve mechanism and/or vertical lift valve for controlling the fluids to a shower installation;

FIG. 8 is a vertical sectional view taken along line 8—8 of FIG. 5 illustrating the spring-biased spherical control means in the "on" position for the valve means of the embodiment of FIG. 1;

FIG. 9 is an enlarged plan view, partly in section taken along line 9—9 of FIG. 8, looking in the direction of the arrows of the spring-biased spherical control means, and illustrating in the solid position the maximum open position of the valve means for blending the temperature of the fluids discharged from the mixing faucet of FIG. 1;

FIG. 10 is an enlarged view similar to FIG. 9 of the spring-biased spherical control means taken along line 10—10 of FIG. 9 looking in the direction of the arrows and also line 10—10 of FIG. 8 showing the relative position of the valve control handle of FIG. 8;

FIG. 11 is an enlarged view in elevation of the means for spring-biasing the spherical control means taken along line 11—11 of FIG. 6 looking in the direction of the arrows, of the mixing faucet of FIG. 1;

FIG. 12 is a bottom view of the spherical control means illustrating the transverse control pin providing the lost motion connection between the spherical control means and the sliding pins for controlling each valve as shown in the enlarged plan view of FIG. 9, and the valve control handle spindle, bevel pinion and rack of the spherical control means as also shown in the enlarged view of FIG. 9;

FIG. 13 is a top plan view of the top pressure plate of the spring-biased spherical control means illustrating the position of the pivoted levers of the lost-motion connection between the transverse pin of the spring-biased spherical control means and the sliding pins for each of the valve means for controlling the fluid supplied to the mixing faucet of FIG. 1;

FIG. 14 is a bottom view of the top pressure plate illustrated in FIG. 13 for the spring-biased spherical control means;

FIG. 15 is an underneath view of the bottom pressure plate complementally formed with respect to the top plate of FIG. 13; and, FIG. 16 is a top view of the bottom pressure plate of FIG. 16.

It is also within the scope of this invention that the spring-biased spherical control means of this invention may be applied to and combined with a mixing faucet for use with a kitchen sink and employing the swivel connection thereof as disclosed in my aforementioned patent.

It is also within the scope of my invention that the spring-biased spherical control means of this invention may be applied to an embodiment similar to that of FIG. 7 for a mixing faucet for a kitchen sink as disclosed in the aforementioned patent.

It is also within the scope of the invention to apply the spring-biased spherical control means to a mixing faucet for a kitchen sink utilizing the valve mechanism for controlling the flow of the fluid to a sprayer used in connection with a mixing faucet as disclosed in the embodiment shown in FIGS. 11 through 15 of my aforementioned patent.

It is also within the scope of my invention to utilize the spring-biased spherical control means in an embodiment of my invention utilizing a sprayer used in connection with a mixing faucet and also employing the swivel connection of the spigot to the mixing faucet as disclosed with reference to FIGS. 11, 12, 13 and 14 of my aforementioned patent.

It is also within the scope of my invention to utilize a valve mechanism such as utilized in connection with the mixing faucet of FIG. 11 of the aforementioned patent in connection with the spring-biased spherical control means of this invention for diverting the fluid controlled by the spring-biased spherical control means of this invention for diverting the fluids either to the discharge spigot, the sprayer used in connection with the mixing faucet, or to a shower head of a bathtub faucet instead of a vertical lift valve such as illustrated in connection with the embodiment of FIG. 1 of this invention, and FIG. 1 of the aforementioned patent.

Referring now more particularly to the drawings, each of the embodiments of the improved mixing faucet will be described, and wherein the same or similar structures are used in each embodiment, the same or prime reference characters will be utilized to identify similar parts. As an example of one form of my improved mixing faucet, particularly adapted for use as a mixing faucet for bathtubs and incorporating a valve construction for diverting the mixed fluids to a shower head will be particularly described with reference to FIGS. 1 through 16. In FIGS. 1 through 16 inclusive, is shown a mixing valve 20 adapted to control the blending and volume of flow of streams of hot and cold water from hot and cold water pipes 21 and 22, respectively. The valve 20 comprises a main body portion 23 formed with tapped holes 24 and 25 to receive the pipes 21 and 22. Similarly formed drilled passageways 26 and 27 are in communication with the tapped holes 24 and 25, the tapped holes preferably tapped to receive a one-half inch pipe. A mixing chamber 28, FIGS. 5, 6, 7 and 8 is in communication with the fluid passageways 26 and 27.

The main body portion 23 may be provided with a boss having a threaded opening such as disclosed in my aforementioned patent, however, as herein illustrated the main body portion 23 is provided with a threaded opening 30, FIG. 7, to receive a one-half inch pipe or coupling 31 which is connected to a shower head, if desired, or if a shower head is not used, this tapped opening 30 may be closed with a conventional pipe plug. The threaded opening 30 communicates with the passageway 32, FIGS. 5, 6, 7 and 8, which in turn extends to the mixing chamber 28. The mixing chamber is not only connected to the passageway 32 for discharge of the mixing fluids to a shower head but is also operatively connected to a chamber 33, FIGS. 6, 7 and 8, formed in a spout housing 34. The spout housing 34 is provided with a discharge spout 35 formed with a passageway 36 connected to the chamber 33 and the chamber 33 in turn is connected to the mixing chamber 28 through a combined opening and valve seat 37.

In order to control the discharge of the fluid from the mixing chamber 28 to either the discharge spout 35 or to a shower head connected to the pipe 31, a vertical lift valve 38 is provided. This vertical lift valve comprises a valve stem 38' vertically mounted in the complementally formed opening 39 provided in a packing gland 40 and suitably reamed for close tolerances to slidably receive the valve stem 38. On the lower end of the enlarged portion 38", and mounted within the chamber 33 is a valve member 41. The valve member 41 preferably comprises a semi-spherical ball member 42 which may be preferably formed from a non-corrosive material such as bronze, neoprene or other suitable material, either integrally formed with the valve stem 38" or integrally molded thereon and complementally formed to the valve seat 37. It is also within the scope of the invention that the disc-like member of the vertical lift valve of my aforementioned patent may be used. The non-corrosive material such as bronze, rubber, neoprene or other suitable material for the semi-spherical ball member or valve should withstand the temperatures of the fluid being controlled with this mixing faucet. The gasket and/or semi-spherical ball member 42 may be affixed to the member 38" by a conventional screw in threaded engagement with the member 38" as is well understood in the art or integrally molded to the enlarged valve stem 38".

It is within the scope of the invention that the vertical left valve 38 is formed from brass or bronze, and that the stem 38' and semi-spherical ball member 42 may be suitably plated with chromium or other suitable plating such as nickel to withstand wear or they may be fabricated from stainless steel to prevent corrosion and, if found desirable, the member 42 may be fabricated from "nylon" of such composition as to withstand the temperatures encountered in the mixing faucet.

The spherical knob 44 may be formed from suitable plastic such as "nylon" and is preferably threaded to the outer end of the valve stem 38'. In order to prevent leakage of the fluid from the chamber 28 about the peripheral surface of the valve stem 38', the packing gland 40, FIGS. 1, 6, 7 and 8, has a threaded member 45 complementally formed to a threaded opening 46 in the upper face of the main body portion 23. An ornamental hexagonal nut 47 permits the attaching and detaching of the vertical lift valve assembly 38. If desired, a suitable gasket (not shown) may be interposed between the bottom face of the hexagonal nut and the upper face of the main body portion contiguous thereto. To properly seal the valve stem 38', a suitable gasket 48 (FIG. 7) is complementally formed to a recess 49 and provided with an opening through which the valve stem 38' is slidably mounted. A compression nut 50 is complementally threaded to a threaded opening 51 in the packing gland 40. The compression or packing nut 50 is provided with openings 52 to receive a special wrench in order to suitably tighten the nut against the packing or gasket 48 to compress the gasket about the peripheral surface of the valve stem to prevent leakage of fluid, and at the same time permit vertical movement of the valve stem through the packing.

In the raised position of the vertical lift valve 38, as shown in the dotted position 44' of the spherical knob 44, FIG. 6, and also as shown in the solid position of the semi-spherical ball member 42 (FIG. 7), the hot or cold fluid or mixture thereof in the mixing chamber 28 may discharge through the opening 37 into the chamber 33 and from there through the passageway 36 of the spout 35. In the closed position of the vertical lift valve 38, FIG. 7, by the solid position of the spherical knob 44, the opening 37 is closed and the hot or cold fluid or mixed fluid from the chamber 28 is discharged through the passage 32 through the pipe 31 to the spray head of the bathtub shower (not shown).

In order to control the fluid passageways 26 and 27 and to provide for complete shut-off of these passageways and to provide for mixing or blending of the fluids, the improved valve construction and controls therefor of my invention will be described more particularly with respect to the showing in FIGS. 1, 2, 3, 4, 5, 6, 7, 8 and the enlarged views of FIGS. 9, 10, 11, 12, 13, 14, 15 and 16. With this improved mixing valve construction, both openings from the passageways 26 and 27 to the mixing chamber 28 may be simultaneously closed so there is no flow from either passageway, and it is also possible to keep one passage shut while the other is open and vice versa, and to open the valve so there is maximum flow from both passages for full intermixing of the fluids and there may also be intermediate mixing of the fluids by proportioning the flow of fluids to so intermix or blend the fluids from cold to hot to full blend and the intermixing thereof as desired within this range. It is also possible to so control the valves that the amount of cold or hot water may be controlled from full shut-off position to maximum discharge and intermediate positions thereof for varying the flow between the shut-off to maximum discharge. The spout housing 34 is provided with a chamber 53 shaped as illustrated in FIGS. 3, 4, 5, 6 and 8 to receive the spring-biased spherical control means 54 and to provide complementally formed means for detachably positioning the spring-biased spherical control means for disassembly and repair. The spout housing 34 is also complementally formed to operatively mount the control means 55 operatively connected to the spring-biased spherical control means for manually selecting the hot, cold or blended mixture of the hot and cold fluids discharged from the mixing faucet and also for preselecting the predetermined quantities thereof as desired.

Referring to FIGS. 1, 2, 3, 4, the spout housing 34 in which the spring-biased spherical control means is operatively positioned is detachably connected to the main body portion 23 by a pair of symmetrically positioned Phillip machine screws 57, only one of which is shown in FIG. 1, which in turn extend through complementally formed openings 34' of the spout housing 34, FIGS. 3 and 4, and threadably engage threaded openings 23', FIG. 2, for detachably connecting the lower end of the spout housing 34 to the main body portion 23. With Phillip screws 57 detached the spout housing 34 may be detached from the main body portion 23 by lifting the spout housing 34 upwardly until the V-shaped transversely extending lug 58 integrally molded with the spout housing 34 is detached from the complementally formed V-shaped notch 59 which leaves the mixing faucet 20 separated in two parts as shown in FIGS. 2 and 3. The complementally formed V-shaped transversely extending lug 58 and complementally formed V-shaped notch 59 are provided by a transversely extending lip 60 integrally molded with the body portion 23 to provide one side of the V-shaped notch 59 which complementally engages a transversely extending notch 61, one edge of which provides a complementally formed side of the V-shaped transversely extending lug 58. The shape of this particular complementally formed locking means integrally formed on the body portion 23 and the spout housing 34 is best shown in transverse cross-section in FIG. 6 and also in FIGS. 1, 2 and 3. Upon the detachment of the spout housing 34 and the main body portion 23 by raising the spout housing 34 to become detached from its complementally engaging portions 58 and 59 and the spout housing 34 moved to the right as viewed in FIG. 1 away from the body portion 23, the spout housing 34 is completely detached from the main body portion 23 for either maintenance and repair of similar valve closure means 62 and 63 for the passageways 26 and 27 which may be readily inspected upon detachment of the closure plate 64 and its gasket 65 from their complementally formed recess 66. The gasket 65 is provided to prevent leakage of fluid from the mixing chamber 28 exteriorly along the plane of separation 67 between the main body portion 23 and spout housing 34 and also to prevent leakage into the chamber 53 for the spring-biased spherical control means 54. The closure plate 64 is provided with a press fit with respect to the periphery of the complementally formed recess 66 in the body portion 23 to also minimize any possible leakage of fluids.

The closure plate 64 operatively supports symmetrically positioned and similarly formed sliding pins 68 which provide the operative connection between the spring-biased spherical control means and the valve closure means 62 and 63 for the passageways 26 and 27. To prevent leakage of fluid of the mixing chamber 28 through openings 69 in the closure plate 64, FIG. 2 and FIG. 5, seal constructions 70 are integrally formed with the closure plate 64. The seal construction 70 may be either integrally formed with the closure plate 64 or separately formed for press fit in openings 71 and may be integrally formed by soldering or brazing of the seal construction 70 to the closure plate 64. As shown in FIGS. 5, 6 and 8, the seal constructions 70 are formed with an annular ring 72 complementally formed to the opening 71 in the closure plate 64 and also complementally formed to slidably receive the sliding pin 68. The opening 69 is preferably reamed for a sliding fit for the sliding pin 68. Packing 73 is complementally formed for reception in its recess 74 of the seal construction 70. An annular packing nut 75 is complementally threaded to the threaded opening 76 of the seal construction 70 and is also provided with openings 77 for the reception of a suitable wrench for tightening the packing nut 75 to prevent any fluid leakage about the periphery of its respective sliding pin 68 slidably mounted therein. To reduce the number of parts by having similarly formed parts, it is within the scope of the invention that the packing nuts 50 and 75 may be of the same size and also that the valve stem 38' and sliding pin 68 may be of the same size to reduce tooling cost. The left ends of the sliding pins 68, FIGS. 5, 6 and 8, are squared at 79 to abut similarly squared ends 80 of the respective stems 81 and 82 of their respective valve closure means 62 and 63. The outer right ends of the sliding pin 68 are rounded as at 83 for operatively engaging complementally formed mechanism to be described later of the spring-biased spherical control means, FIGS. 5, 6 and 8, and also as shown in the enlarged views, FIGS. 9 and 10.

Although the sliding pin 68 may be formed from cold rolled steel, the carbon content from SAE 1025 to 1080 sufficient to be heated treated and/or case hardened as desired. it is preferred to form these sliding pins 68 from stainless steel to prevent any corrosion of these sliding pins in view of the different conditions in which mixing faucets of this type will have to operate, as the water analysis varies from place to place and may vary in degrees of hardness and iron content through very wide ranges from relatively soft water to very hard water and from very little iron content to water with a high iron content such as might effect the operativeness of this mixing faucet. It is also within the scope of the invention that although preferred to make these sliding pins 68 separately from the stems 82 that the stems 82 and sliding pins 68 may be integrally formed. If this is the case, it is also within the scope of the invention that the valve closures 63 would preferably be fabricated from stainless steel although nominally the valve closures 63 would be fabricated from brass or bronze. Although it is preferred to make the abutting ends of the stems 82 and sliding pins 68 square, it is also within the scope of the invention that the end of the pins may also be rounded and if thought desirable the end of the stem abutting the pins could be complementally formed to provide an abutting surface to correct any angularity and/or misalignment because of slight imperfections in manufacture.

To complete the description of the mechanism operatively mounted within the mixing chamber 28 of the main body portion 23, the valve closure means will be described with particular reference to FIGS. 5, 6, 7 and 8. Each flow opening 87 of the passageways 26 and 27 is controlled by the similar valve closure means 62 and 63. Since each of these valve closure means is identical, only one will be described and this will be that for the hot water passage 26, as shown in FIGS. 1, 6 and 7. Each passageway 26 and 27 has mounted therein a combined flow-control member and gasket support 90. The flow-control portion is substantially cylindrical in form and complemental to the passageways 26 and 27. This member has four flutes 91 symmetrically arranged and formed as illustrated. Each valve closure means, in addition to the flow-control member and gasket support 90 substantially cylindrical in shape, has also integrally formed therewith a conical portion 92 into which the flutes 91 extend as shown in FIGS. 5 and 6. Also integrally formed with the portions 90 and 92 is a smaller cylindrical portion 93 complementally formed to a cylindrical opening 94 providing guide means for the valve closure means 62 and 63. The cylindrical guide portion 93 is provided with two diametrically arranged flutes 95 to provide a relief chamber along with the cylindrical space 96 for any of the fluid which may be trapped upon the closure of the valve closure means 62 and 63 in a closed position of the valve closure means as shown in FIGS. 5 and 6. In the particular embodiment shown, the diameter of the passageways 26 and 27 is substantially ⅝" and the length thereof 15/16". The diameter of the cylindrical passage or opening 94 is ⅜" and the length thereof also ⅜". The deminsions as shown in FIGS. 5, 6, 7 and 8 are substantially full scale. The members 62 and 63 and portions thereof are fabricated to provide for free flow of the incoming fluids and also for sliding motion and full support of the members 62 and 63 without binding. Integrally formed with the flow control member and gasket support 90 is an annular disc 97 for receiving an annular disc washer 98 formed from rubber or other suitable sealing material such as neoprene and the like for withstanding the fluid temperatures of the hot and cold water or other fluids supplied to the mixing faucet. The hole of the annular washer 98 is complementally formed to tightly fit a reduced portion 99 annular in shape, and of lesser diameter than the flow-control member and gasket support 90, as shown in FIG. 6. The flow control member is preferably integrally formed with the stem 82 and also preferably formed from a non-corrosive material such as brass and/or bronze or other non-ferrous materials such as molded nylon of suitable characteristics to withstand the hot and cold temperatures of the fluid supplied to the mixing faucet. It is also within the scope of the invention that the sliding pins 68 may also be integrally formed and of the same material as the flow-control member and gasket support. The intersection of the tapped holes 24 and 25 with their respective drilled passageways 26 and 27 provide an opening 100 for the flow of fluid from the lines 21 and 22 to their respective passageways 26 and 27 into the mixing chamber 28 upon the opening of the valve closure means 62 and 63. In this embodiment it was found preferable to have the valve closure means 62 and 63 open under the pressure of the fluid supplied upon release of the control means 55 from its full closed to intermediate and full open positions as it was found that if the closure means 62 and 63 were closed under the operation of the fluid pressure thereagainst there was a chattering of the closure means 62 and 63 upon the actuation of the control means. In this embodiment, as illustrated, the closure means 62 and 63 are maintained in their closed position by the weight of the control means 55 and the friction supplied by the spring-biased spherical control means 54.

With the vertical lift valve 38 in its closed position as shown in FIG. 6, the hot, cold or mixed fluid in the mixing chamber 28 in the intermediate and open positions of the valve closure means 62 and 63 is discharged from the mixing chamber 28 through an opening 101, FIGS. 6, 7 and 8, into the passageway 32 and from there to the shower head connected to the pipe coupling 31. In the raised position of the lift valve means 38, FIGS. 7 and 8, the valve stem 38" provides a stop for limiting the upward movement of the vertical lift valve 38. The spherical knob 44 may be complementally formed with a threaded opening for receiving the threaded upper end of the stem 38'. In order to detach the vertical lift valve 38, the ornamental hexagonal nut is detached and the semispherical ball member 42 is slightly smaller than the threaded member 45 so that the entire vertical lift valve may be detached through the opening for inspection and repair of the vertical lift valve.

In order to control the fluid passageways 26 and 27, and since the valve closure means 62 and 63 have been particularly described with respect to FIGS. 5, 6, 7 and 8 with regard to the main body portion 23 which, when detached from the spout housing 34, appears as separated in the left side of FIG. 1 and as also viewed in FIG. 2, there will now be described more particularly with respect to the showings in FIGS. 1, 3, 4, 5, 6, 7 and 8 and in the enlarged views of FIGS. 9 through 16 the improved controls for the valve closure means to provide for mixing or blending of the fluids. With this improved mixing valve construction, both flow openings 87 of the fluid passageways 26 and 27 from the mixing chamber 28 may be simultaneously closed so there is no flow from either passageway, and it is also possible to keep one passage shut while the other is open and vice versa, and to open the valve so there is maximum flow from both passages for full intermixing of the fluids and there may also be intermediate mixing of the fluids by proportioning the flow of fluids to so intermix or blend the fluids from cold to hot to full blend and the intermixing thereof as desired within this range. It is also possible to so control the valve that the amount of cold or hot water may be controlled from full shut-off position to maximum discharge and intermediate positions therein for varying the flow between the shut-off to maximum discharge.

Referring to FIGS. 1, 4, 6 and 8, the spout housing 34 is provided with a slotted opening 102 to receive a spindle 103 of the operator-operated control means 55 in order to limit the vertical angular movement of the control means 55 from its "off" position in the solid lines of FIG. 6 to the full "open" position of both the hot and cold valve closure means 62 and 63, respectively, for the blended discharge of the hot and cold fluids. In the uppermost position of the control means 55, the control means 55 may be rotated to the left in the direction of the arrow 104 and the indicia H, the valve closure means 62 will be open to its maximum position so that the mixing faucet discharges only hot water and when the control means 55 is rotated to the right in the direction of the arrow 105 and indicia C, the valve closure means 63 will be open to its maximum position for the full discharge of cold water and the closure means 62 for the hot water will be completely shut off. Reference is made to FIG. 1 and FIG. 9 for illustrating the indicia for indicating the direction of rotation of the control means 55 for hot or cold water and the intermediate positions. The arrow 106 has a portion 106' also engraved on the control means 55 and a continuation 106" extending toward the slotted opening 102 in order to indicate in the intermediate position of the control means 55 whether the fluid discharged from the mixing faucet is blended more to the hot range of temperature of the fluid when the arrow 106' is the left of the arrow portion 106" or whether it is blended more toward the cold range of the mixed fluids when the control means is to the right of the arrow portion 106". In full open position to full closed position the arrow portions 106' and 106" are in alignment. An arrow head 107 of the arrow 106 engraved on the spout housing 34 is also in alignment with an arrow head indicia 107' to further indicate upon movement of the control means 55 the relative movement of the control means with respect to its full "on," full "off" and intermediate positions.

The control means 55 has an elongated shaft portion 108 shaped as shown in FIGS. 1, 5 and 6 and upon which the indicia 104, 105, H, C, and the arrow shaft 106' are engraved, and has a spherical surface 109 complementally formed to a spherical surface 110 of the spout housing 34 to permit arcuate vertical movement of the control means relatively with respect to the elongated slotted opening 102 and also rotary movement to the left and to the right through a predetermined angular range about the same center of the spherical surfaces 109 and 110, the center of rotation being that of the center of rotation of the spherical member 111 of the spring-biased spherical control means 54. The center of rotation 112 is the center of rotation of the spherical member 111 and it is also the center of the radius of curvature of the spherical surfaces 109 and 110, respectively, of the spout housing 34 and control means 55. The spring-biased spherical control means 54 may be detached and/or removed from the chamber 53 by loosening the Allen set screw 113 until the set screw disengages a flattened portion 114 of the spindle 103, whereupon the control means 55 may be detached from the spindle 103 by pulling outwardly on a fluted knob 115. The fluted knob 115 is provided with four symmetrically positioned flutes 115' providing finger-engaging portions for adjusting the spring-biased spherical control means 54 from full "off" to full "on" position and in the intermediate positions thereof for adjusting the flow of the discharged fluid and also for adjusting the hot and cold water supply in its full "on" or full "off" positions and intermediate blended positions thereof. The handle or control means 55 is secured to the spindle 103 in the reverse manner and secured in position by the set screw 113 engaging the flattened portion 114 on the spindle. In the assembled position of the handle as shown in FIG. 1, FIG. 5 and FIG. 6, the mixing faucet is controlled by a sensitive finger tip adjustment using the fluted knob 115 as described before. With the removal of the handle or control means 55, the spring-biased spherical control means may be detached as a unit as shown in FIG. 3 wherein the spout housing 34 has been detached as described above by the removal of the Phillip screws 57 and the mixing faucet separated in halves with the main body portion 23 assembled within the wall or to the bathtub, kitchen sink or wash basin as is described with reference to my aforementioned patent for the various embodiments disclosed therein. In this instance, the spout housing 34 is also a separate unit including the control handle 55 and the spring-biased spherical control means 54. However, upon detachment of the control means 55 as described before, the spring-biased control means 54, together with the operatively mounted spindle 103 may be detached as a separate unit for inspection, maintenance and repair.

Referring to FIGS. 3 and 5, the spring-biased spherical control means 54 is detached from the spout housing 34 by moving outwardly with respect to the showing in FIG. 3 and to the left with respect to the showing in FIG. 5. A top support plate 116, FIGS. 3, 13 and 14, is slidably mounted for attachment and detachment from the spout housing 34 in symmetrically and oppositely positioned grooves 117 which are arcuately and complementally formed to receive the arcuate portions 117', FIGS. 13 and 14 of the top support plate 116. The arcuate-shaped grooves 117 are formed by upper and lower symmetrically arranged and vertically spaced members 118 and 119 integrally formed with the spout housing 34 as shown in FIGS. 3 and 4. The symmetrically positioned slots 117 may be machined or injection molded or die cast to slidably receive the top support plate 116. A bottom plate 120 is suspended for vertical adjustment from the top plate 116 by vertically positioned round headed machine screws and/or adjusting screws 121 symmetrically positioned with respect to a countersunk head machine screw 122. The machine screws are standard ⅛" machine screws and are supported on springs 123, the springs being mounted in the recessed openings 124 in the top plate 116, FIGS. 5, 6, 8, 11 and 13, with the screws 121 and 122 extending, respectively, through openings 121' and 122' to receive the respective round headed and flat headed machine screws and in threaded engagement with the complementally threaded holes 121" and 122", FIG. 15. The spring mounted adjusting screws 121 and 122 are adapted to spring bias the spherical member 111 operatively mounted therebetween to place the necessary friction thereon to maintain the valve closure means 62 and 63 in their closed position along with the weight of the handle when positioned in the "off" position. Likewise, the amount of spring bias placed upon the spherical member 111 by the upper and lower pressure plates 116 and 120 also maintain the control means 55 in any of its adjusted positions within full "off" to full "on" and the intermediate position with respect to quantity and blend of the fluids and in full "open" and full "closed" position of the respective valve closure means 62 and 63 for the hot and cold water supply.

Referring to FIGS. 5, 6 and 8 and the enlarged views—FIGS. 10, 11, 13, 14, 15 and 16 the upper pressure plate 116 and the lower pressure plate 120 are formed as shown, with the upper pressure plate formed with a spherical surface 125 and the lower pressure plate formed with a similar spherical surface 126 to complementally receive the surface of the spherical member 111 to permit rotation of the spherical member 111 through the angular range permitted by the movement of the spindle 103 of the control means 55 in the slot 102, and also to permit rotation of the spherical member 111 by the rotary movement of the control means 55 about the longitudinal axis of the spindle 103, these movements being about the center 112 of the spherical member 111. To reduce the cross-section of the upper pressure plate 116 and lower pressure plate 120, each are similarly formed with raised portions 127 and 128. The raised portion 127 is formed with a clearance hole 129 for an Allen wrench for the adjustment of an Allen-type set screw which has a lug or projection 131 for engaging an annular groove 132 about a reduced portion 103' of the spindle 103 as shown in the assembled view of FIG. 8 and the enlarged views, FIGS. 9 and 10. The Allen-type set screw 130 is threaded complementally to a threaded portion 133 of a swivel mounting member 134 within which the spindle 103 is operatively mounted for rotation about its longitudinal axis being retained in position by the lug or projection 131 of the Allen-type set screw 130. The swivel mounting member 134 also permits angular movement of the spherical member 111 as shown in FIG. 9 upon rotation of the control means 55 about its longitudinal axis for the adjustment of the valve closure means 62 and 63 in full "open" position as shown in the solid line of a transverse pin 135 to full "closed" position of the cold water valve closure means 63 and full "open" position of the hot water valve closure means 62 as shown in the dotted position 135' of the transverse pin 135. The swivel mounting member 134, when the spring-biased spherical control means 54 is detached from the spout housing 34, also permits relative angular movement of the spherical member 111 upon rotation of a bevel pinion 136 operatively connected to its complementally formed segmental portion of the bevel gear 137 which is complementally formed with respect to the bevel pinion 136.

The bevel pinion which has sixteen teeth is secured in its operative position on the spindle 103 by an Allen set screw 138 and the pinion 136 meshes with a complementally formed eight tooth segment of a ring-type gear and the swivel mounting member 134 with the set screw 130 operatively engaging the spindle 103 since the spindle 103 is rotatably mounted within the swivel member 134 and also rotatably mounted within a segmental slot 139, the control means 55 may be rotatably moved about the axis of the spindle 103 and also vertically arcuately moved within the slot opening 102 to permit the necessary control of the mixing faucet for the fluids discharged therefrom. Referring to FIGS. 9, 11 and 12 with the assembled spherical member 111, bevel pinion 136, spur gear 135 and spindle 103, rotation of the spindle 103 angularly adjusts the spindle 103 within the segmental slot 139 and also angularly moves the swivel mounting member 134 of the spindle 103 which is operatively mounted therein for rotation about the longitudinal axis of the spindle 103.

Referring to FIG. 8, it is preferred to provide a cylindrically shaped swivel member 134 complementally formed for journaling in a bearing portion 139 and may also have integrally formed therewith a pin portion 140 which is also complementally formed to be journaled within a bearing portion 141 formed co-axially with the bearing portion 139 in the spherical member 111. These openings are preferably either drilled or die cast within the spherical member 111 for sufficient clearance to provide free rotation of the member 134 and its associated pin location 140. The pin portion 140 is of sufficient length to be retained within a slot 142, FIGS. 8, 10, 15 and 16, provided in the lower pressure plate 120. The slot 142 is arcuate in shape and permits the same relative movement as is provided by the elongated slot 102 for vertical angular movement of the spindle 103 from "off" to full "open" position of both the hot and cold valve closure means 62 and 63.

In the modified embodiment of FIG. 10, the swivel mounting member 134' is similarly formed as the swivel mounting member 134 of FIG. 8 and is similarly formed for the operative mounting of the spindle 103. However, in this embodiment a pin portion 140' is not integrally formed with the swivel mounting member 134 as described with reference to FIG. 8, but instead is press fitted within a complementally formed opening 143 and in this instance the pin portion 140' is slidably mounted within the opening 142 the same as the pin portion 140 of the disclosure of FIG. 8 but yet it does not swivel as does the pin portion 140. However, the same adjustment is permitted with the embodiment of FIG. 10 as that of FIG. 8.

Although it is preferred to fabricate the upper and lower pressure plates 116 and 120 from brass or bronze to prevent any corrosion and also to apply pressure to the spherical member in order to develop suitable frictional resistance to resist the opening of the valve closure members 62 and 63, the spherical member to withstand wear would preferably be fabricated from steel and suitably heat treated or case hardened to resist wear. Likewise, the bevel pinion 136 and bevel spur gear portion 137 would also be preferably fabricated to prevent any rusting from moisture from within the chamber 53 within which the spring-biased spherical control means 54 is operatively mounted, for example, making the bevel pinion 136 of brass or bronze and the bevel gear 137 from steel suitably heat treated or case hardened to provide additional wear. It is also within the scope of the invention that the bevel gear portion 137 may be integrally formed with the sperical member 111. It is also within the scope of the invention that it may be formed as a separate member as shown in FIGS. 8, 9 and 11 and affixed in a complementarily formed recess 144 of the spherical member 111. The spherical member 111 and the bevel gear portion 137 are suitably drilled in the assembled position of the gear portion 137 with the spherical member 111 to receive a hardened pin 145. The length of the pin is substantially the width of the bevel gear portion 137 though it may extend to the periphery of the spherical member 111. In either case the pin 145 may be detached to permit repair and replacement of the bevel gear 137. It is also within the scope of the invention to provide a more sensitive finger tip control that the bevel gear 136 may be integrally formed with the spindle 103 to provide a smaller bevel gear to be complementally formed to a suitable meshed gear portion 137 in order that a more sensitive fingertip control with respect to the adjustment of the valve closure members 62 and 63 may be had. Although suitable lubricant may be applied between the frictional surfaces of the upper and lower pressure plates 116 and 120 in contact with the spherical member 111, it is also within the scope of the invention that the spherical member and pressure plates may be fabricated from "nylon" of a suitable composition and when humidified will provide self-lubricating surfaces which will not require any lubricant and similarly the members may be injection molded to include the various operating members, for example, such as to integrally mold the transverse pin 135 and the bevel gear section 137. It is also possible to mold the bevel gear from "nylon" to the spindle 103. It is also within the scope of the invention that the members 134 and/or 134' of FIG. 8 and FIG. 10 may be injection molded from "nylon" to provide a self-lubricating member within the spherical member 111 whether it is formed from steel or "nylon." It is also within the scope of the invention that these parts may be suitably molded from sintered powder metal of the type required.

A lost-motion construction for permitting the valve closure means 62 and 63 to be simultaneously closed by moving the control means 55 downwardly and to permit simultaneous opening under water pressure in the full "open" position of both of these valve closure means 62 and 63 and for intermediate adjustment of the flow and also for adjustment from full "open" position of one valve closure means and full "closed" position for the other, has been provided between the transverse pin 135 operatively mounted on the spherical member 111 and the resepctive sliding pin 68 operatively abutting the respective stems 81 and 82 of the valve closure means 62 and 63. Referring to FIGS. 3, 5, 6, 7, 9 and 10, this particular lost-motion connection will be described. Freely dependent cam levers 146 and 147 are pivotally supported and symmetrically positioned on pins 148 operatively mounted on the upper pressure plate and/or top support plate 116. Although these cam levers 146 and 147 may have a slight frictional engagement with the slides of slots 146' and 147' within which they are operatively mounted it is also within the scope of the invention that they may in their operative position as shown in FIG. 6 be free to take the vertical position shown in the solid lines under the action of gravity. Although it is preferred to fabricate these cam levers 146 and 147 from cold rolled steel and suitably hardened or case hardened, these cam levers may also be suitably formed from a suitable "nylon" composition to provide self-lubricating surfaces between the peripheral surface of the transverse pin 135 and also between the rounded ends 83 of the sliding pins 68. In order to provide for the proper movement of the lost-motion connection between the spherical member 111 and the associated valve closure means 62 and 63, the transverse pin 135 in the "off" position as shown in FIG. 6 is preferably located 0.115" below the center line of the spindle 103 as shown in FIG. 6, and 0.250" to the left of the vertical center line of the spherical member 111 also is shown in FIG. 6. In the position as shown in FIG. 6 and in the solid position of FIG. 9, the cam levers 146 and 147 take the position in the full "off" position with the transverse position 135 in the position as shown in FIG. 6. In the full "on" position as shown in the dotted position of the control means 55, the cam levers 146 and 147 and the pin 135 would take the dotted position as shown in FIG. 6. In the full "open" position, for example, of the hot water closure means 62, the pivoted cam levers 146 and 147 would take the dotted position as shown in FIG. 9 with the transverse pin 135 taking the dotted position as shown in 135'. Also in this position the ends of the transverse pin 135 operatively engage the beveled cam surface 149 as shown in the dotted position of the cam lever 146 and the dotted position of the transverse pin 135. In the full "open" position for the cold water closure means 63, the pivoted cam levers 146 and 147 and the pin 135 would take a similar angle position but opposite to that as shown in FIG. 9. Intermediate positions would vary within the maximum angularity in either direction of the pin 135. Also in the full "on" position as shown in the dotted position of the control means 55 of FIG. 6, a clearance opening 150 is provided for the bevel pinion 136 and further clearance is provided by the arcuate surface 150' as shown in FIG. 14.

It is therefore believed quite evident that there has been disclosed a very simple mechanism which includes the control means 55, the spring-biased spherical control means 54 and its associated lost-motion mechanism as just described which will permit of a finger-tip control with relatively slight effort on the part of the operator to control the operative positions of the valve-control means 62 and 63 for the hot and cold water inlets to obtain any desired temperature from cold to hot, blended temperatures therebetween and any desired rate of flow desired of cold water, hot water and the blended fluid. Likewise, the pressure needed for applying the necessary friction on the spherical member 111 to maintain the control means 55 in any of its adjusted positions against the water pressure of the hot and cold fluid acting upon the valve closure means 62 and 63 to open them is readily adjusted by adjusting the spring pressure by adjusting the machine screws 121 and 122. The spring pressure can be adjusted within any particular range so that the control means operates easily by manipulation of the fingers of the operator so that even a child may readily operate the mixing faucet in the adjusted position of the control means for the temperature and quantity of hot, cold or mixture thereof, as desired. There has also been described a spring-biased spherical control means which may be readily dismantled for inspection, repair or lubrication by simply removing the two Phillip screws 57, set screw 113 and withdrawing the mechanism from its position as shown, for example, in FIG. 3 wherein the spout housing 34 is completely separated from the rest of the mechanism. This mechanism may also be simply replaced in the reverse order. It is also very simple to inspect, repair and replace the gaskets and/or annular disc washers 98 from the valve closure means 62 and 63, or replace the entire valve closure means, if desired. Similarly it is very simple to adjust the pressure on the packing for the sliding pins 68 to prevent any leakage about the periphery thereof. Although a gasket 65 has been described with reference to the closure plate 64, it is within the scope of the invention that any suitable gasket solution may be applied without the need of the rubber gasket, and similarly at the plane of separation 67 between the main body portion 23 and the spout housing 34, suitable liquid gasket material may also be applied, and as also may be applied underneath the ornamental hexagonal nut 47 of the vertical lift valve 38. Likewise the packing for the spindle 38' of this lift valve may be suitably adjusted and replaced as has been described above.

In order to adjust the spring-biased spherical control means 54 without the need of detaching the spout housing 34 and removing the spring-biased spherical control means therefrom, a closure countersunk screw 122a may be removed from the spout housing, FIGS. 1, 3, 5, 6 and 8, and the countersunk screw 122 may be suitably adjusted for the spring pressure desired. After adjustment the closure screw 122a may be replaced. From the above description of the adjustments, one needs only standard tools such as a screwdriver, Phillips' screwdriver, a set of Allen wrenches and spanner wrenches for the compression nuts, all common tools available to the plumber and home-owner.

A bathtub mixing faucet of this type is usually not mounted on the bathtub, but is assembled above it and extends through the wall where it is connected to the hot and cold water pipes 21 and 22. In order to securely mount the bathtub faucet in position and also to support the piping 31 for the shower head, lugs 151 and 152 (FIGS. 1 and 7) are provided for affixing to suitable framing of the wall contiguous to the bathtub faucet and are provided with holes 153 for mounting suitable securing means to extend through the openings into studding or other framework. With this improved construction, it is possible to assemble the bathtub faucet in position so that the piping 21 and 22 is mounted within the studding of the wall contiguous to the bathtub and with substantially one-half or three-fourths of an inch to the left of the ornamental hexagonal nut 47 protruding so that suitable tiling or other surfacing may be applied to the wall for a recessed bathtub or the like.

It is also preferred to make all parts, such as a valve operating member and/or control means 55, the spring-biasing means (except for the springs though these may be made of bronze), the flow control members 90, and all of the detachable parts such as tacking nuts and the like which may come in contact with the fluid to be mixed, from non-corrodible material such as brass and preferably from solid brass rods or castings which may then be suitably machined, though it is also within the scope of the invention that these parts may be fabricated from suitable plastic materials such as "nylon" which is non-corrodible and which will withstand the temperature of operation of the mixing faucet. It is also within the scope of the invention that certain parts may be suitably die-cast and also formed from suitable sintered powder metal and "nylon" which may be injectinon molded to reduce the cost of the mixing valve construction. All of the exterior parts are suitably nickel-plated and a protective coating of chrome-plate may be applied as desired to complete the ornamental appearance of the bathtub fixture. It is also within the scope of the invention that these exterior parts may also be fabricated from "nylon." Other modifications of material and structure may occur to those skilled in the art without departing from the scope of the invention.

It is also within the scope of the invention that the control mechanism of this mixing faucet may be utilized for a mixing valve and faucet of the type modified for use with a kitchen sink which may be of either a single or double basin type and may use a spout housing construction, for example, as that as disclosed in my aforementioned patent. It is also within the scope of the invention that additional ornamentation may be applied to the mixing faucet for a sink such as disclosed in the aforementioned patent in order to provide suitable soap dishes. With ornamental housings as used with a mixing faucet for a sink, suitable heavy plating and nickel and chrome shall be applied to the housing to withstand the detergents, soaps and other corrodible fluid encountered in the kitchen.

It is also within the scope of the invention to use the adjusting mechanism of this invention for a type of mixing faucet adapted for use with bathroom lavatories as disclosed in the aforementioned patent.

It is also within the scope of the invention to use the control mechanism of this invention in an improved mixing faucet such as disclosed in the aforementioned patent, and to also use a valve-actuating mechanism and the like for controlling a spray nozzle for spraying dishes operatively connected to a kitchen sink type of mixing faucet.

It is to be understood that a spray hose and spray nozzle of the type as disclosed in the aforementioned patent may be located contiguous to a mixing faucet embodying the control mechanism of this invention as is well understood in the art so that the spray hose may be pulled outward or drawn back in, upon release, beneath the sink.

It is also to be understood that the control valve or vertical lift valve 38 as described with reference to FIG. 1 might be suitably modified with a mixing faucet construction of the type used for kitchen sinks as disclosed in the aforementioned patent for controlling the fluid discharge through the swivel spout thereof without departing from the scope of the invention. Other modifications will suggest themselves to one skilled in the art.

If it is desired to have soap trays, the ornamental housing such as described with reference to the aforementioned patent may be used without departing from the scope of the invention, but in mixing faucets of the type used for kitchen sinks, a larger ornamental housing may be required in view of the fact that this embodiment is for use with hot and cold water pipes spaced either "four inches, six inches or eight inches." It is also within the scope of the invention that a larger size ornamental housing may be required in utilizing mixing faucets of the type disclosed in the aforementioned patent and incorporating a control mechanism of this invention.

It is also to be understood that it is within the scope of the invention that all parts subject to corrosion may be made of suitable cast brass parts, or die cast from suitable sintered metal to further reduce the cost. Also, all of the ornamental surfaces are to be suitably copper and chrome plated to provide for a highly ornamental fixture for the parts of the mixing faucet which are exposed unless they are fabricated from suitable plastic such as "nylon" which may have incorporated therein color to match the color of the sinks, lavatories and bathtubs, to which mixing faucets of this type may be applied.

From the foregoing description, it is obvious that several embodiments of improved faucet construction have been disclosed for use either as a fixture for a bathtub, a lavatory, a kitchen sink and which also may be used with a shower head for a bathtub, and also with spray heads as an attachment for kitchen faucets. These embodiments of the various mixing faucets may be simply and economically fabricated and are readily disassembled for repair and replacement of parts. In addition, a minimum of parts is required for modifying certain faucet parts thereof into the various embodiments which have been described.

Having thus described my invention, it is obvious that various immaterial modifications may be made in the same without departing from the spirit of my invention; hence, I do not wish to be understood as limiting myself to the exact form, construction, arrangement and combination of parts herein shown and described, or uses mentioned.

What I claim as new and desire to secure by Letters Patent is:

1. A mixing valve comprising a main body portion formed with a mixing chamber operatively connected to passageways, said passageways being adapted for connection to respectively hot and cold water lines, a discharge spout connected to the mixing chamber, valve means operatively associated with said mixing chamber for controlling the aforesaid passageways for hot and cold water discharge to the mixing chamber, a spout housing operatively associated with said main body portion, said spout housing formed with a chamber, spring-biased spherical control means operatively mounted within said chamber, said valve means including disc valve means for closing each of said first-mentioned passageways, sliding pin means operatively connecting said disc valve means to said spring-biased spherical control means, a closure plate for said mixing chamber, said sliding pin means operatively mounted on said closure plate, said sliding pin means at one end operatively engaging said disc valve means and said sliding means at the opposite end operatively engaging said spring-biased spherical control means, operator-operated means angularly and rotatably connected to said spring-biased spherical control means for operating said disc valve means for closing each of said first-mentioned passageways and opening one or the other of said first-mentioned passageways and for intermediate opening of said passageways for blending the mixture of hot and cold fluids within said mixing chamber, said operator-operated means operatively connected to said spring-biased spherical control means for actuating said disc valve means within a predetermined vertical angular movement from full closed at one position of said operator-operated means, full open at another position of said operator-operated means, and upon rotation of said operator-operated means in one direction to full open position of said disc valve means for the cold water line and upon rotation of the operator-operated means in the opposite direction to full open position of the disc valve means for said hot water line and full closed position of said disc valve means for said cold water line, and intermediate positions of said operator-operated means for blending the fluid from said hot and cold water lines for the maximum discharge of said blended fluids, and upon intermediate movement of said operator-operated means within the angular movement from closed to open position, the quantity of fluid discharged from the mixing faucet is varied between maximum and no-flow and also upon rotation of the operator-operated means in either direction, the temperature of the blended fluid is varied for the respective position of the quantity of fluid discharged from the mixing faucet.

2. A mixing faucet comprising a main body portion formed with a mixing chamber operatively connected to a plurality of inlet passageways, said passageways being adapted for fluid connection to inlet lines for different fluids, a discharge spout operatively connected to the mixing chamber, valve means operatively associated with said mixing chamber for controlling the aforesaid inlet passageways to the mixing chamber, a spout housing operatively associated with said main body portion, said spout housing formed with a chamber, spring-biased spherical control means operatively mounted within said chamber, said valve means including disc valve means for closing each of said first-mentioned pasageways, each of said disc valve means operatively connected to said spring-biased spherical control means, a closure plate for said mixing chamber, said disc valve means including stem means operatively mounted on said closure plate, operator-operated means angularly and rotatably connected to said spring-biased spherical control means for operating said disc valve means for closing each of said first-mentioned passageways and opening one or the other of said first-mentioned passageways and for intermediate opening of said passageways for blending the mixture of hot and cold fluids within said mixing chamber, said operator-operated means operatively connected to said spring-biased spherical control means for actuating said disc valve means within a predetermined vertical angular movement from full closed at one position of said operator-operated means, said operator-operated means extending through a slot formed in the spout housing and contiguous to the spring-biased spherical control means permitting the predetermined vertical angular movement, and said operator-operated means operatively mounted with respect to said spring-biased spherical control means for rotation of said operator-operated means in one direction to full open position of said disc valve means for the cold water line and to closed position for the hot water line and upon rotation of the operator-operated means in the opposite direction to full open position of the disc valve means for said hot water line and full closed position of said disc valve means for said cold water line, and intermediate positions of said operator-operated means for blending the fluid from said hot and cold water lines for the maximum discharge of said blended fluids, and upon intermediate movement of said operator-operated means within the angular movement from closed to open position, the quantity of fluid discharged from the mixing faucet is varied between maximum and no-flow and also upon rotation of the operator-operated means in either direction, the temperature of the blended fluid is varied for the respective position of the quantity of fluid discharged from the mixing faucet.

3. A mixing faucet comprising a main body portion formed with a mixing chamber operatively connected to a plurality of inlet pasageways, said passageways being adapted for fluid connection to inlet lines for different fluids, a spout housing complementally formed to the main body portion for detachably mounting the spout housing with respect to the main body portion and comprising means for detachably affixing the spout housing to the main body portion, a closure plate for said mixing chamber operatively mounted on the main body portion, valve means operatively associated with said mixing chamber for controlling the aforesaid inlet passageways to the mixing chamber and complementally formed means associated with said valve means and said closure plate and extending through said closure plate for controlling the aforesaid valve means, said spout housing provided with a chamber, spring-biased spherical control means operatively mounted within said chamber of the spout housing and adapted to be detached with the spout housing from the main body portion so that the valve means operatively associated with said mixing chamber may be inspected and also that said spring-biased spherical control means is adapted for detachment and removal from the spout housing, a control means for said spring-biased spherical control means adapted to be attached to and detached from said spring-biased spherical control means permitting the spring-biased spherical control means to be detachably mounted and withdrawn from said chamber of said spout housing for inspection, adjustment and repair.

4. A mixing valve comprising a main body portion formed with a mixing chamber operatively connected to said passageways, said passageways being adapted for connection to respectively hot and cold water lines, a spout housing detachably connected to said main body portion, said main body portion including a closure plate for completing the mixing chamber, valve means operatively associated with said mixing chamber for controlling the aforesaid passageways for hot and cold water discharged to the mixing chamber, said spout housing including a chamber, spring-biased spherical control means operatively mounted within said chamber, means associated with said spout housing and complementally formed to said spring-biased spherical control means for detachably mounting the spring-biased spherical control means within said chamber of said spout housing, means operatively connecting said valve means with said spring-biased spherical control means and operatively extending through said closure plate, whereby upon detachment of the spout housing from the main body portion the spring-biased spherical control means is operatively disconnected from the valve means and upon replacement of the spout housing and affixing to the main body portion, the spring-biased spherical control means is operatively connected to the aforesaid valve means.

5. A mixing valve comprising a main body portion formed with a mixing chamber operatively connected to passageways, said passageways being adapted for connection to respective hot and cold water lines, a passageway connected to the mixing chamber adapted for discharging fluid from the mixing chamber to a shower head, a closure plate for said mixing chamber, a spout housing detachably connected to the main body portion, a valve passageway formed in said mixing chamber, a discharge passageway of said spout housing complementally formed to and operatively connected to said valve passageway of said mixing chamber of the main body portion, and valve means operatively controlling said valve passageway whereby in one position of the valve means fluid is discharged from the mixing chamber to the passageway adapted to be connected to a shower head, and in another position of the valve meeans fluid is discharged through the valve passageway to the discharge passageway of the spout housing, said spout housing and said main body portion complementally formed for detachably connecting and disconnecting the spout housing to the main body portion and in the detached position of the spout housing the discharge passageway of the spout housing is disconnected from the valve passageway of the mixing chamber of the main body portion, valve means operatively associated with said mixing chamber for controlling the passageways for hot and cold water discharged to the mixing chamber, operator-operated means operatively mounted on the spout housing, lost motion means operatively connecting the valve means for controlling the hot and cold water discharged from the mixing chamber and operatively associated with the control means of the spout housing so that upon detachment of the spout housing from the main body portion, the control means for the valve means for controlling the aforesaid passageways for hot and cold water discharged from the mixing chamber becomes operatively disassociated with said valve means for controlling the aforesaid passageways for hot and cold water discharged from the mixing chamber, and upon attachment of the spout housing to the main body portion said lost motion means of the control means is operatively associated with the valve means operatively associated with said mixing chamber for controlling the aforesaid passageways for hot and cold water discharged to the mixing chamber.

6. A mixing valve comprising a main body portion formed with a mixing chamber operatively connected to passageways, said passageways being adapted for connection to respectively hot and cold water lines, valve means operatively associated with said mixing chamber for controlling the aforesaid passageways for hot and cold water discharged to the mixing chamber, a spout housing operatively associated with said main body portion including a discharge spout operatively connected to the mixing chamber, said spout housing formed with a chamber, spring-biased spherical control means operatively mounted within said chamber, said spring-biased spherical control means including operator-operated control means operatively associated with said spout housing, said spring-biased spherical control means comprising a spherical member operatively connected to said operator-operated control means associated with said spout housing, upper and lower pressure plates operatively associated with said spherical member, spring means for adjustably biasing the spring pressure applied to the spherical member, pivoted cam lever means operatively associated with said valve means operatively associated with said mixing chamber, said pivoted cam lever means operatively mounted movement on said upper pressure plate, a transverse pin operatively mounted on said spherical member and providing a lost motion connection between said pivoted cam lever means, said operator-operated control means including a spindle operatively mounted for rotation with respect to the spherical member, complementally formed gear means on said spindle and said spherical member permitting relative rotation of said operator-operated control means with respect to said spherical member, whereby the traverse pin is adapted for operative association with said pivoted cam lever means on rotation of said spindle in either direction and upon angular vertical movement of said operator-operated control means whereby upon actuation of said operator-operated control means with said spring-biased spherical control means for actuating said disc valve means within a predetermined vertical angular movement from full closed at one position of said operator-operated control means, full opened at another position of said operator-operated control means, and upon rotation of said operator-operated control means, in one direction to full open position of said disc valve means for the cold water line and upon rotation of the operator-operated control means in the opposite direction to full open position of the disc valve means for said hot water line and full closed position of said disc valve means for said cold water line, and intermediate positions of said operator-operated control means for blending the fluid from said hot and cold water lines for the maximum discharge of said blended fluids, and upon intermediate movement of said operator-operated control means within the angular movement from closed to open position, the quantity of fluid discharged from the mixing faucet is varied between the maximum and no-flow and also upon rotation of the operator-operated control means in either direction, the temperature of the blended fluid is varied for the respective position of the quantity of fluid discharged from the mixing faucet.

7. A spring-biased spherical control means for a mixing faucet including a mixing chamber operatively connected to passageways, said passageway being adapted for connection to respectively hot and cold water lines, valve means operatively associated with said mixing chamber for controlling the aforesaid passageways for hot and cold water discharged to the mixing chamber, and a spout housing operatively associated with said main body portion, said spring-biased spherical control means including an operator-operated control means operatively associated with said spout housing and said spring-biased spherical control means, said spring-biased spherical control means also including a spherical member, upper and lower pressure plates operatively associated with said spherical member, adjustable spring-biased means operatively associated with said upper and lower pressure plates for adjustably varying the frictional pressure between the spherical member and the upper and lower pressure plates, a spindle for said operator-operated control means detachably connected to said spherical member, said spindle extending substantially along a radius of said spherical member to the center thereof, a swivel mounting member pivotally mounted with respect to said spherical member on a radius thereof at right angles to the axis of said spindle, securing means operatively mounted on said swivel mounting member adapted for detachably mounting said spindle member and permitting rotation of said spindle member with respect to said spherical member and said swivel mounting member, gear means operatively mounted on said spindle and said spherical member permitting relative angular movement of said spherical member with respect to said spindle upon rotation of said spindle member about its longitudinal axis, stop means operatively mounted on said spherical member and complementally formed with respect to said lower pressure plate allowing angular movement of said spindle within the plane of said spindle and stop means, complementally formed stops means with respect to said spindle formed on said spout housing permitting vertical angular movement of said spindle within a predetermined angular movement in the plane of said spindle and said stop means of said spherical member, a segmental slot operatively formed in said spherical member in the plane of said spindle permitting relative angular movement of said spindle with respect to said spherical member upon rotation of said spindle in either direction, a transverse pin operatively mounted on said spherical member below the axis of the spindle in a plane parallel to the axis of the spindle and to the left of the axis of the swivel mounting member in a plane parallel to the axis of the spherical mounting member and at right angles to the axis of the spindle, pivoted cam lever means operatively mounted and symmetrically positioned with respect to the longitudinal axis of the spindle, and said transverse pin providing a lost motion connection between said pivoted cam lever means and said spherical member, whereby upon angular adjustment of operator-operated control means and rotary movement of said operator-operated control means in opposite directions within the vertical angular adjustment of said control means, the aforesaid valve means for controlling the aforesaid passageways for hot and cold water discharged to the mixing chamber are operatively controlled from closed to full open position of both said valve means and for the closure of one of said valve means on the opening of the other of said valve means, and control of the intermediate temperatures from hot to cold and the quantity discharged therefrom in the intermediate positions of said operator-operated control means upon rotation and vertical angular movement.

8. In a mixing faucet comprising a main body portion formed with a mixing chamber operatively connected to a plurality of inlet passageways, said passageways being adapted for fluid connection to inlet lines for different fluids, valve means operatively associated with said mixing chamber for controlling the aforesaid inlet passageways to the mixing chamber, a spout housing detachably and operatively associated with said main body portion, spring-biased spherical control means operatively associated with said valve means, and complementally formed for attaching and detaching to the spout housing, operator-operated control means operatively mounted with respect to the exterior of said spout housing and operatively connected to said spring-biased spherical control means, said spherical control means including a lost motion connection operatively associated with said valve means for controlling the aforesaid inlet passageways to the mixing chamber, said valve means in one direction operative under the fluid pressure applied to the valve means from the inlet passageways, and said spring-biased spherical control means operative for controlling said valve means against the fluid pressure operative against the valve means, means for biasing the spring-biased spherical control means in conjunction with the friction and weight of the operator-operated control means for operatively maintaining the relative position of said valve means in any one of the adjusted positions of the operator-operated control means.

9. A mixing faucet comprising a main body portion formed with a mixing chamber operatively connected to a plurality of inlet passageways, said passageways being adapted for fluid connection to inlet lines for different fluids, valve means operatively associated with said mixing chamber for controlling the aforesaid inlet passageways to the mixing chamber, a spout housing complementally formed to the main body portion for attachment and detachment thereof from the main body portion, a closure plate complementally formed to the mixing chamber of the main body portion for closing the mixing chamber of the main body portion with respect to the spout housing, means for actuating said valve means operatively and symmetrically positioned on said closure plate, sealing means for preventing leakage of fluid from said mixing chamber along said means for actuating said valve means, spring-biased spherical control means operatively mounted upon said spout housing for detachment therewith from the main body portion and said means for actuating said valve means, operator-operated control means pivotally connected to said spring-biased spherical control means, said operator-operated control means operative under fingertip movement for controlling said spring-biased spherical control means in any one of the adjusted positions of the operator-operated control means in vertical movement in a predetermined direction and upon angular rotative motion in opposite directions thereof, and said spring-biased spherical control means and said operator-operated control means operatively mounted for detachment from the spout housing and said spring-biased spherical control means respectively.

10. As an article of manufacture, a main body portion for a mixing valve including a spout housing therefor, said main body portion comprising a mixing chamber operatively connected to passageways, said passageways being adapted for connection to respectively hot and cold water lines, said mixing chamber and main body portion formed with symmetrically positioned valve openings, flow control members and gasket supports operatively mounted in said passageways complementally formed thereto and adapted for slidably supporting said flow control member and gasket support, a closure plate complementally formed to said main body portion completing and adapted for sealing the mixing chamber, and operative means including sliding pins extending through said closure plate and slidably mounted thereon, said sliding pins symmetrically arranged for operatively engaging each of said flow control members and gasket supports for the operation hereof.

11. As an article of manufacture, a spout housing for a mixing valve comprising a main body portion formed with a mixing chamber operatively connected to passageways, said passageways being adapted for connection to respectively hot and cold water lines, valve means operatively associated with said mixing chamber for controlling the aforesaid passageways for hot and cold water discharged to the mixing chamber, said spout housing complementally formed to said main body portion for detachably supporting said spout housing on said main body portion, detachable securing means adapted for detachably securing the spout housing to said main body portion, said spout housing comprising a chamber, spring-biased spherical control means complementally formed to said chamber of said spout housing, said spring-biased spherical control means including an upper pressure plate, support means complementally formed to said upper pressure support plate for detachably disconnecting said spring-biased spherical control means within said chamber of said spout housing, said spout housing complementally formed with an elongated vertical slot, said spring-biased spherical control means including a spindle operatively connected thereto and adapted for extending through the aforesaid elongated vertically position slot, operator-operated control means detachably positioned on said spindle and complementally formed at its inner end contiguous to the vertically positioned elongated slot to a complementally formed spherical surface of said spout housing contiguous thereto, whereby the operator-operated control means is adapted to be angularly adjusted vertically within said elongated slot and rotatably mounted angularly in either direction with respect to the longitudinal axis of said spindle in any of the adjusted vertical positions of said spindle within said vertically positioned elongated slot.

12. As an article of manufacture, a spout housing in accordance with claim 11, wherein said spring-biased spherical control means includes a lower pressure plate similarly formed to the upper pressure plate and spaced vertically therefrom, spring-biased adjustable means operatively supported from said upper pressure plate and detachably connected to said lower pressure plate, a spherical member complementally formed to complementally formed spherical recesses of the upper and lower pressure plate, said spring-biased adjustable means adapted to apply spring pressure to said spherical member operatively mounted between said upper and lower pressure plate but permitting relative movement of said spherical member in any of its operative positions, a swivel mounting member diametrically mounted on an axis of said spherical member, said spindle operatively mounted on said swivel mounting member along an axis of said spherical member at right angles to the axis of said swivel mounting member in the same plane thereof, permitting rotation of said spindle member with respect to said swivel member in opposite directions of rotation of said spindle, and a recess formed in said spherical member permitting angular movement of said spindle with respect to the spherical member within a plane including the axis of the spindle member at right angles to the axis of the swivel mounting member, and gear means complementally formed on the spindle and the spherical member permitting angular movement of said spindle member in the recess of said spherical member in which the spindle is operatively mounted, stop means complementally formed on said spherical member and said lower pressure plate angularly limiting the angular movement of said spherical member between the upper and lower pressure plates in the vertical angular movement of said spindle within the elongated vertically positioned slot formed in said spout housing and also permitting rotation of said spindle upon actuation of said operator-operated control means in either direction in any of the adjusted vertical positions of said operator-operated control means with respect to said elongated vertically positioned slot formed within said spout housing.

13. As an article of manufacture, a spout housing according to claim 12, wherein said swivel mounting member comprises a stop member of the aforesaid stop means, said swivel mounting member and said stop means integrally formed and complementally formed with respect to said spherical member for swivel movement about the longitudinal axis of said swivel member, said swivel mounting member complementally formed for rotatably mounting the inner end of the spindle, and securing means complementally formed for attaching and detaching to the swivel mounting member and complementally formed to an annular recess at the inner end of the spindle permitting rotary movement of said spindle within said swivel mounting member, and a segmental recess formed in said spherical member and complementally formed to said spindle, permitting swivelling movement of said spindle and said swivel mounting member about the axis of the swivel mounting member.

14. As an article of manufacture, a spout housing for a mixing valve according to claim 12, wherein said swivel mounting member is operatively mounted with respect to a diametrical axis of said spherical member, said swivel mounting member adapted for rotatably mounting said spindle, securing means complementally threaded for attaching and detaching to the swivel mounting member, and said securing means complementally formed to an annular recess at the inner end of the spindle for permitting rotational movement of said spindle with respect to said swivel mounting member and permitting the spindle to be attached and detached from the swivel mounting member, said stop means including a stop member operatively mounted on the axis of the swivel member and affixed to said spherical member for operatively engaging an elongated slot in said lower pressure plate for limiting the vertical angular movement of said spindle within the vertically positioned elongated slot of said spout housing.

15. As an article of manufacture, a spout housing for a mixing valve according to claim 12, including a lost motion connection between said valve means operatively associated with said mixing chamber for controlling the aforesaid passageways for hot and cold water discharged to the mixing chamber and the aforesaid spherical member, said lost motion connection including pivoted cam lever means dependent from the upper pressure plate and symmetrically arranged thereto and adapted for operatively connecting the aforesaid valve means to said spherical member, a transverse pin affixed to said spherical member and extending laterally thereof with the opposite ends thereof operatively engaging the outer faces of said pivoted cam lever means, whereby upon operation of the operator-operated control means to the closed position thereof said valve means are closed against the pressure of the incoming hot and cold water discharged to the mixing chamber, and upon said operator-operated control means moved into the on position of said operator-operated control means, said valve means are opened with the pressure of said hot and cold water discharged to the mixing chamber, said operator-operated control means and the associated spindle therefor being movable vertically angularly in the aforesaid vertically positioned elongated slot in the spout having contiguous to the operator-operated control means.

16. As an article of manufacture, a spout housing for a mixing valve according to claim 15, wherein said spherical member is angularly adjustable upon rotation of said spindle of said operator-operated control means within said vertically elongated positioned slot formed in said spout housing in any of the intermediate positions of said operator-operated control means from off to full open position, and said transverse pin is angularly adjustable in either direction and adapted for operatively engaging the lower ends of said pivoted cam lever means providing a lost motion connection between the aforesaid valve means, whereby said valve means for each of said hot and cold water lines is adapted in one position of said transverse pin to close said one valve means and to permit the other said valve means to be opened under the pressure of the fluid thereagainst and upon rotation of the operator-operated control means in the opposite direction said second mentioned valve means is closed and the first mentioned valve means is opened and in the intermediate rotative positions of said spindle in any of its vertical adjusted positions the amount and temperature of the hot and cold water are adjusted.

17. As an article of manufacture, a spring biased spherical control means for a mixing valve comprising a main body portion formed with a mixing chamber operatively connected to passageways, said passageways being adapted for connection to hot and cold water lines, valve means operatively associated with said mixing chamber for controlling the aforesaid passageways for hot and cold water discharged to the mixing chamber and also comprising a spout housing operatively associated with said main body portion, said spout housing formed with a chamber, said spring-biased spherical control means adapted to be operatively mounted within said chamber, said chamber including symmetrically positioned grooves adapted to detachably mount said spring-biased spherical control means, said spring-biased spherical control means including an upper pressure plate complementally formed to said symmetrically positioned grooves of said spout housing, a lower pressure plate suspended from said upper pressure plate, a spherical member pivotally mounted between said upper and lower pressure plates, adjustable spring-biased securing means operatively supported upon said pressure plate and operatively engaging said lower pressure plate for spring-biasing said spherical member operatively mounted therebetween, said spout housing formed with an elongated vertical slot and a spherical surface contiguous thereto, said spring-biased spherical control means including a spindle, said spindle adapted to extend through said vertical elongated slot of said spout housing in the assembled position of said spring-biased spherical control means within said spout housing, and operator-operated control means complementally formed for detachably connecting to said spindle and formed for detachably connecting to said spindle and formed with a spherical surface complementally formed to the spherical surface of said spout housing contiguous to said vertical elongated slot of said spout housing, whereby in the operatively attached position of said operator-operated control means said spindle is adapted to be movable within the vertical elongated slot with an arcuate sliding movement and is adapted for rotation in opposite directions in any of the vertically adjusted positions of said operator-operated control means, and complementally formed gear means operatively mounted on said spindle and said spherical member permitting vertical and rotative movement of said spindle within the aforesaid vertical elongated slot.

18. As an article of manufacture, a spring-biased spherical control means for a mixing valve according to claim 17, including lost motion means adapted for operatively connecting to said valve means of said mixing valve, said lost motion means including laterally spaced pivoted cam lever means operatively mounted on said upper support plate, and spaced laterally with respect to a plane extending through the longitudinal axis of said spindle and perpendicular to the plane of said upper pressure plate, said pivoted cam lever means extending downwardly and spaced above the upper face of the lower pressure plate, a transverse pin affixed to said spherical member and the ends of the transverse pin extending laterally for operative engagement with said pivoted cam lever means, said pivoted cam lever means adapted for operative engagement with means operatively connected to said valve means, whereby in the lower position of the operator-operated means in the vertical elongated slot the valve means are closed, in the upper position of the operator-operated control means, the valve means are both open under the pressure of fluid acting upon the valve means, and upon rotation of the operator-operated control means in the full open position thereof in either direction, the valve means may be operated from full open to full closed position of one of the valve means depending upon the direction of rotation and in the intermediate positions of rotation the temperature of the fluid is blended, and in the intermediate vertical positions of the operator-operated control means and rotation thereof the amount and temperature of the fluid may be varied.

19. As an article of manufacture, a spring-biased spherical control means for a mixing valve according to claim 18, wherein said spherical member includes a swivel mounting member operatively journaled in the swivel member along a diameter of the spherical member at right angles to the axis of the spindle extending along a radius of the spherical member, said swivel mounting member and the inner end of said spindle complementally formed permitting detachment of said swivel mounting member and said spindle and rotation of said spindle within said swivel mounting member, a segmental recess formed in said spherical member for slidably and rotatably mounting said spindle, securing means operatively mounted on said swivel mounting member for operatively engaging an annular recess of said spindle permitting detachment of said spindle upon attaching said securing means in the secured position of said spindle permitting rotation thereof in either direction, complementally formed stop means formed on said spherical member and said lower pressure plate permitting angular movement of said spherical member upon vertical angular movement of said spindle and rotation of said spherical member upon rotation of said spindle in either direction, and an opening formed in the upper pressure plate so that upon movement of the spherical member in alignment therewith the securing means operatively mounted on the swivel mounting member may be attached and detached to detach said spindle from said spherical member, and said spout housing including a detachable closure in alignment with one of said spring-biased securing means permitting adjustment of the upper and lower pressure plates in the assembled position of the spring-biased spherical control means within the spout housing.

References Cited in the file of this patent
UNITED STATES PATENTS

| | | |
|---|---|---|
| 558,034 | Brown | Apr. 14, 1896 |
| 966,682 | Gowie | Aug. 9, 1910 |

FOREIGN PATENTS

| | | |
|---|---|---|
| 426,313 | Italy | Oct. 23, 1947 |